US005772313A

United States Patent [19]
Taylor

[11] Patent Number: 5,772,313
[45] Date of Patent: Jun. 30, 1998

[54] OPTICAL MEANS FOR ANNULAR ILLUMINATION OF A SPOT

[75] Inventor: Nicholas John Taylor, Harrow Weald, United Kingdom

[73] Assignee: Eastman Kodak Company, Rochester, N.Y.

[21] Appl. No.: 374,678

[22] PCT Filed: Jul. 28, 1993

[86] PCT No.: PCT/GB93/01595

§ 371 Date: Jan. 25, 1995

§ 102(e) Date: Jan. 25, 1995

[87] PCT Pub. No.: WO94/03829

PCT Pub. Date: Feb. 17, 1994

[51] Int. Cl.⁶ ........................................... F21V 9/00
[52] U.S. Cl. .......................... 362/298; 362/299; 362/304; 362/346
[58] Field of Search .................... 362/297, 298, 362/299, 300, 302, 303, 304, 305, 308, 346

[56] References Cited

U.S. PATENT DOCUMENTS

| 1,699,108 | 1/1929 | Halvorson, Jr. ........................ 362/304 |
| 3,825,322 | 7/1974 | Mast ........................................ 350/236 |
| 4,389,701 | 6/1983 | Phillips ................................... 362/308 |
| 4,422,135 | 12/1983 | McCamy ............................... 362/346 |

FOREIGN PATENT DOCUMENTS

| 0189027 | 1/1986 | European Pat. Off. ........ B23K 26/06 |
| 3504366 A1 | 2/1985 | Germany ........................ G02B 17/00 |
| 0169889 | 7/1989 | Japan ........................................ 362/299 |
| 2191572 | 5/1986 | United Kingdom .............. F21V 5/04 |

OTHER PUBLICATIONS

Applied Optics, vol. 7, No. 10, 15 May 1978, pp. 1532–1536, Rioux et al, "Linear, Annular, and Radial Focusing with Axicons and Applications to Laser Machining."

Japanese abstract, "Irradiating Method for Laser;" vol. 7, No. 25, (M–190) (1170) 02 Feb. 1983.

Primary Examiner—Y. Quach
Attorney, Agent, or Firm—Clyde E. Bailey, Sr.

[57] ABSTRACT

An optical system operable to focus an annular beam of light onto a spot 16 comprises a paraboloidal reflector 10 with a lamp 12 at its focus, a coaxial annular convex lens 13 and a coaxial internally silvered conical mirror 15. A parallel beam of light formed by reflection by the reflector 10 of light from the lamp 12, is formed into a convergent annular beam by the lens 13 and reflected by the mirror 15 which is located between the lens 13 and its focus so that it converges to the spot 16.

2 Claims, 1 Drawing Sheet

OPTICAL MEANS FOR ANNULAR ILLUMINATION OF A SPOT

DESCRIPTION

This invention relates to an optical system operable to focus an annular beam of light onto a spot.

In reflection densitometry there is often a requirement to illuminate a sample at 45° with light of a narrow beam width, see International Standards Organization ISO Standard 5/4 'Geometric conditions for reflection density'. This ideally takes place over a full 360° cone to ensure that the orientation of directionally reflective materials does not effect the resulting measurement.

If an optical system for forming a narrow annular beam converging at 45° onto a spot on a sample to illuminate that spot is formed substantially as is described in GB-A-2191572 or, alternatively, comprises a lamp mounted at the centre of the reflective surface of a paraboloidal reflector so as to produce a substantially parallel beam of light, a disc mounted co-axially with the axis of the paraboloidal reflector in the path of the parallel beam of light so as to restrict that beam such that the light that passes it is an annular, parallel beam of light co-axial with the axis of the reflector, and a simple converging lens mounted co-axially with the axis of the paraboloidal reflector on the other side of the disc remote from the paraboloidal reflector whereby the annular parallel beam is caused to converge and focus on the spot which is on the axis of the paraboloidal reflector, the required lens must have a large focal ratio (f/no). This is difficult to achieve and, in addition, there is little space available between the lens and the sample to house the necessary detector which senses light reflected by the sample perpendicular to its plane.

An object of this invention is to provide an optical system which more easily achieves the desired result than is the case when a simple converging lens is used and which provides adequate space for accommodation of a detector operable to sense the light reflected perpendicular to the sample plane.

U.S. Pat. No. 4,422,135 discloses the use of an aspherical mirror arranged so that its reflecting surface has an annular concave form extending around an axis of rotational symmetry, the radial cross-section being that of an elliptical segment. A cylindrical mirror is connected to the radially outer edge of the aspherical mirror and focuses the convergent annular beam to form a single spot image on the axis of the annular beam. Although this arrangement eliminates the need for a lens having a large f/no it does not increase the space available to house the detector.

According to this invention there is provided an optical system operable to focus an annular beam of light onto a spot, the system comprising a light source, optical means operable to form light emitted by the light source into an annular beam having a convergent annular width the optical means comprising a concave mirror having an axis of rotational symmetry which is coincident with the axis of the optical system and an annular mirror interposed co-axially in the path of the annular beam and positioned so as to be impinged by the latter before it has focussed to form a narrow annular image, the annular mirror being operable to deflect the annular beam whereby to form a single spot image on the axis of the annular beam, wherein the annular mirror comprises a conical mirror and the optical means are arranged so that said annular beam converges towards said conical mirror symmetrically with respect to each line parallel to the optical axis and located on a notional right cylindrical surface which has said narrow annular image as its diameter and which is coaxial with the axis of the optical system.

In one embodiment, said optical means comprise means operable to form light emitted by the light source into an annular parallel beam of light and an annular converging lens mounted co-axially with and in the path of the annular parallel beam and operable to converge it into said annular beam having a convergent annular width.

Preferably said means operable to form light emitted by the light source into an annular parallel beam of light comprise a paraboloidal reflector which has the light source at its focus. The present invention enables light to be collected and used more efficiently than where a simple converging lens is used in conjunction with such a paraboloidal reflector because light reflected from a greater annular surface area of the paraboloidal reflector can be used to form the annular parallel beam that is focussed by the annular converging lens.

A mirror, especially a spherical section mirror, may be placed in the centre of the annular converging lens and at a slight angle to the axis of the paraboloidal reflector to produce an image of the light source alongside the light source itself whereby to double the effective size of the light source.

In another embodiment said optical means operable to form light emitted by the light source into an annular beam having a convergent annular width comprises an aspherical mirror arranged so that its reflecting surface has an annular concave form extending around an axis of rotational symmetry, the radial cross-section being that of an elliptical segment. The radially inner edges of the annular concave reflecting surface may coincide on the axis of the convergent annular beam or may be equispaced on either side thereof.

Two embodiments of this invention will be described now by way of example with reference to the accompanying drawings, of which:

Figure 1:
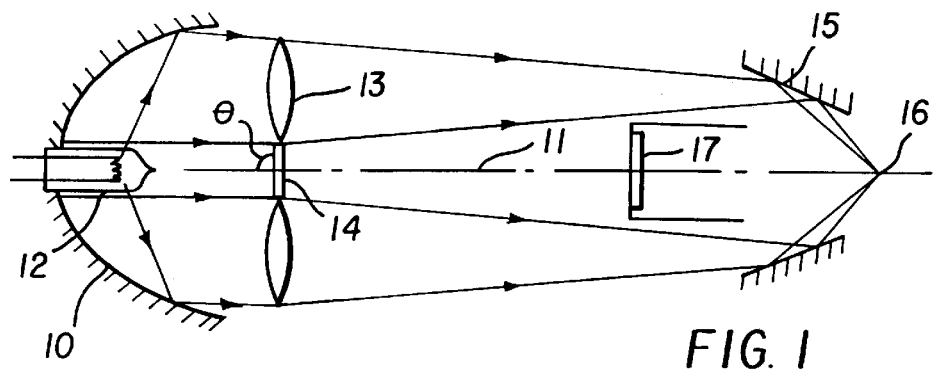
FIG. 1 is a diagrammatic illustration of one form of an optical system for reflection densitometry.

FIG. 1 shows the optical system comprises a paraboloidal reflector 10 having an axis 11, a lamp 12 mounted at its focus and a coaxial annular convex lens 13. The inside diameter of the annular lens. 13 is equal to the diameter of the lamp 12 and the outside diameter of the lens 13 is equal to the diameter of the brim of the paraboloidal reflector 10. A parallel beam of light formed by reflection by the paraboloidal reflector 10 of light emitted by the lamp 12 is directed through the annular lens 13 so that it emerges on the other side of that lens 13 as an annular beam having a convergent annular width. A baffle 14 is placed in the centre of the annular lens 13 to block light which does not pass through the lens 13.

An internally silvered conical mirror 15 is mounted coaxially in the path of the annular beam having a convergent width between the annular lens 13 and the narrow ring image that would be formed by that beam at the focus of the annular lens 13. The mirror 15 causes the annular light beam to be deflected so that it converges to a small focussed spot 16 on the axis 11 which would be a spot on the sample of which the reflectivity or reflection density is to be measured.

The light reflected by the mirror 15 forms a convergent narrow conical beam of light which makes an angle of 45°±5° with the axis 11.

A light detector 17 is mounted coaxially with the axis 11 adjacent the larger diameter end of the conical mirror 15 and is operable to detect the amount of light reflected perpendicularly from the sample that is illuminated by the spot 16 to give a measure of the reflectivity or reflection density of the material of the sample.

The use of the annular convex lens 13 and the internally silvered conical mirror 15 in combination means that the focal length of the convergent lens does not have to be small for conical illumination of a spot of the sample by light directed to it at approximately 45° to the axis 11 to be achieved.

According to FIG. 1 a spherical section mirror may be placed in the centre of the annular lens 13 and at a slight angle θ to the axis 11 so that it produces an image of the filament of the lamp 12. Thus, light emanating from filament and passing through sperical section mirror 14 effectively doubles the diameter of the lamp 12 for emitting light.

Figure 2:
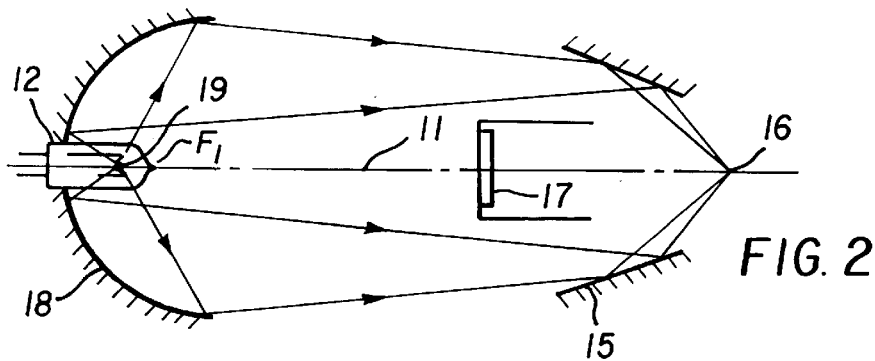
FIG. 2 is a diagrammatic illustration of another form of an optical system for reflection densitometry.
Figure 3:
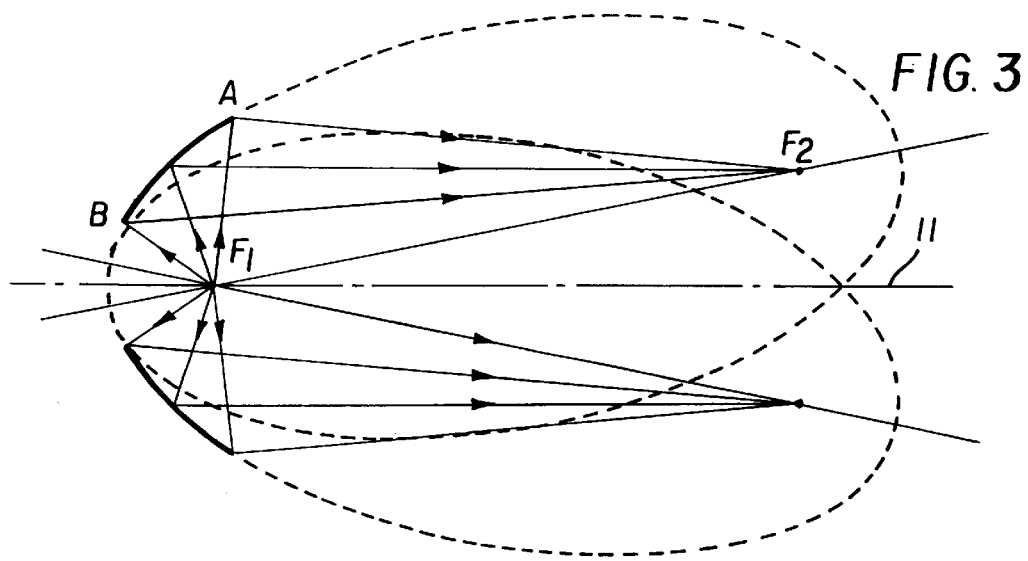
FIG. 3 illustrates the formation of the mirror used in the optical system illustrated in FIG. 2, and its operation.

FIG. 2 shows that the system described above with reference to and as illustrated in FIG. 1 can be modified to achieve the same end result by replacing the paraboloidal reflector 10 and the annular convex lens 13 by an aspherical mirror 18. The latter is formed by rotating a section of an ellipse, namely the section A-B shown in FIG. 3, through 360°, the major axis of the ellipse being inclined at an angle to the optical axis 11 of the system and having one of its foci, $F_1$, on that axis 11. Thus the mirror 18 has an annular concave form, the radial cross-section of which is part of an ellipse. The radially inner edge of the annular concave section of the mirror 18, namely the point B in FIG. 3, may be spaced from the axis 11 as shown in FIG. 3 to provide room for the lamp 12. Alternatively it may be on the axis 11.

FIG. 2 shows the lamp filament 19 is positioned at the focus $F_1$ of the ellipse. As can be seen in FIG. 3, focus $F_1$ is along the axis 11 of the ellipse 18. Light emitted by that filament 19 is reflected by the ellipse 18 and focussed at the other focus $F_2$ of the ellipse as is shown in FIG. 3.

Light emitted by the lamp 12 is reflected by the mirror 18 to form an annular beam having a convergent annular width symmetrically disposed around the axis 11. That beam is deflected by the conical mirror 15 as has been described above with reference to FIG. 1.

I claim:

1. An optical system operable to focus an annular beam of light onto a spot, the system comprising a light source having a diameter and means for optically forming light emitted by the light source into a convergent annular beam, said means for optically forming comprising means forming a beam of light emitted by the light source and an annular converging lens mounted along a path formed by the beam of light and converging said beam of light into said convergent annular beam, convergent reflecting means arranged in a path defined by the annular convergent beam and positioned so as to be impinged by the light before it has focused to form a narrow annular image, the convergent reflecting means deflecting the convergent annular beam so as to form a single spot image on an axis defined by the annular beam.

2. An optical system according to claim 1, wherein a mirror is arranged centerwise of the annular converging lens to produce an image of the light source such that the diameter of the light source is effectively doubled.

* * * * *